May 1, 1951
F. T. HILLIKER
2,550,998
HOODED FOOD CONTAINER
Filed Jan. 18, 1946
3 Sheets-Sheet 1
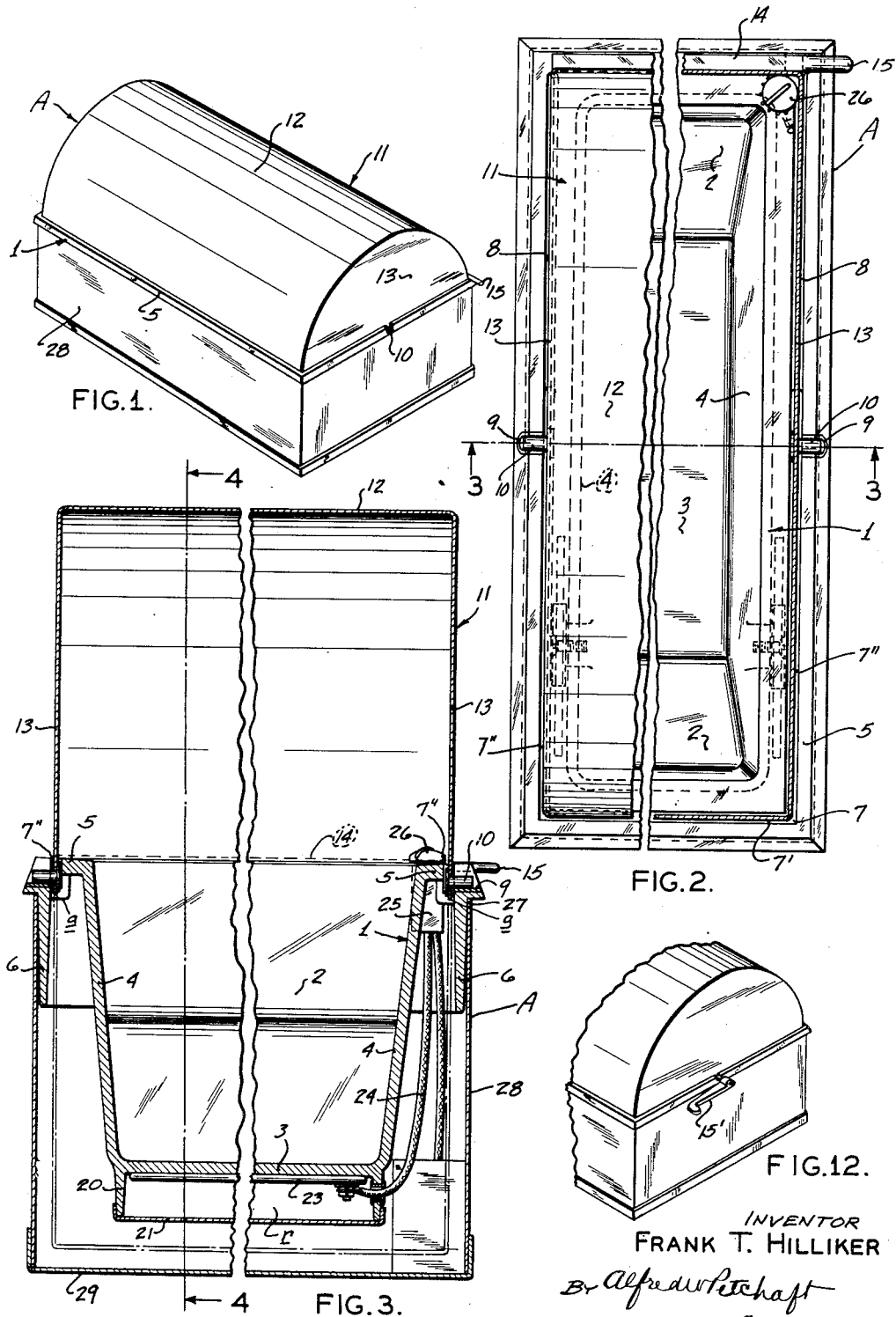
INVENTOR
FRANK T. HILLIKER
By Alfred W Petchaft
ATTORNEY May 1, 1951  F. T. HILLIKER  2,550,998
HOODED FOOD CONTAINER
Filed Jan. 18, 1946  3 Sheets-Sheet 2

INVENTOR
FRANK T. HILLIKER
By Alfred W. Petchaft
ATTORNEY

May 1, 1951 F. T. HILLIKER 2,550,998
HOODED FOOD CONTAINER
Filed Jan. 18, 1946 3 Sheets-Sheet 3

INVENTOR
FRANK T. HILLIKER
By Alfred W. Petcheft
ATTORNEY

Patented May 1, 1951

2,550,998

UNITED STATES PATENT OFFICE 2,550,998

HOODED FOOD CONTAINER

Frank T. Hilliker, St. Louis, Mo.

Application January 18, 1946, Serial No. 642,067

6 Claims. (Cl. 220—30)

This invention relates in general to certain new and useful improvements in hooded food containers.

It is a primary object of the present invention to provide a hooded food container which is simple and economical in design and construction and is provided with a unique disappearing cover or hood which can be shifted to a completely concealed position beneath the food receptacle so as to leave the food contained therein fully displayed and fully accessible for serving.

It is a further object of the present invention to provide food containers of the type stated which are provided with means for keeping edible, and either warm or cold as may be desired, the food therein contained.

It is a further object of the present invention to provide a food container of the type stated which is provided with a cover or hood which is dynamically counterbalanced so that it may be very easily moved from closed to open position with a minimum of manual effort.

And with the above and other objects in view, my invention resides in the novel features of form, construction, arrangement and combination of parts presently described and pointed out in the claims.

In the accompanying drawings (three sheets)—

Figure 1 is a perspective view of a hooded food container constructed in accordance with and embodying the present invention;

Figure 2 is a fragmentary horizontal sectional view of the hooded food container;

Figure 3 is a fragmentary vertical sectional view of the hooded food container taken along line 3—3 of Figure 2;

Figure 5:
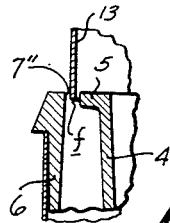
Figure 6:
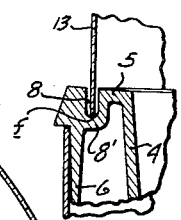
Figure 4:
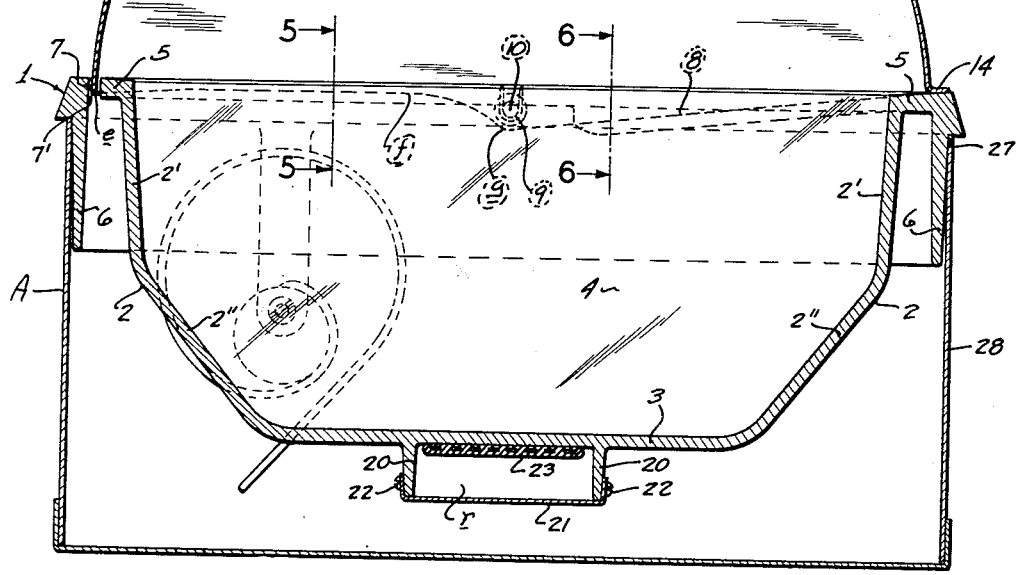
Figure 4 is a transverse sectional view of the hooded food container taken along line 4—4 of Figure 3 and showing the cover or hood in closed position.
Figure 7:
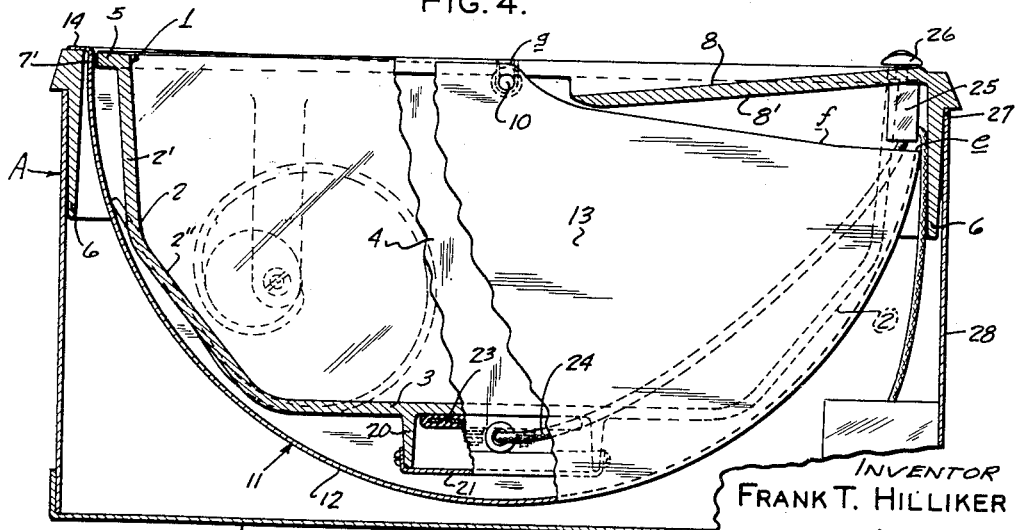

Figures 5 and 6 are fragmentary sectional views taken respectively along lines 5—5 and 6—6 of Figure 4;

Figure 7 is a transverse view of the hooded food container partly broken away and in section showing the cover or hood in open position;

Figures 8, 9, 10, and 11 are fragmental schematic views showing the interaction between the cover or hood and the retardation spring-cam; and Figure 12 is a fragmental perspective view of a modified form of hood-manipulating handle forming a part of the present invention.

Referring now in more detail and by reference characters to the drawings which illustrate practical embodiments of the present invention, A designates a hooded food container comprising an integral pot-shaped casting 1 of preferably oblong-rectangular horizontal cross-sectional shape, having side walls 2, including upper more or less vertical portions 2', and inwardly converging or oblique lower portions 2", connected by a flat bottom wall 3, and substantially vertical end walls 4. Formed integrally with and extending horizontally outwardly from the upper margins of the side walls 2 and end walls 4 is a flange 5 having an integrally formed peripheral skirt 6 depending vertically therefrom in outwardly spaced parallel relation to the upper portions 2' of the side walls 2 and the proximate portions of the end walls 4. The flange 5 is provided with a narrow U-shaped slot 7 having a bight-portion 7' and leg-portion 7" extending, respectively, in outwardly spaced parallel relation to one side wall 2 and the end walls 4, the leg-portions 7" terminating a short distance past the horizontal center line of the side walls 4, and formed in the flange 5 as continuations of the slot-legs 7" are grooves 8 likewise extending in spaced parallel relation to the end walls 4 and terminating adjacent the other side wall 2, the grooves 8 being provided with bottom walls 8' which taper upwardly and outwardly from their inner ends to their outer ends and are, at such outer ends, substantially flush with the upwardly presented face of the flange 5.

Formed in the outer portions of the flange 5 along the horizontal center line of the end walls 4, and separated from the main portion of the flange 5 by the slot-legs 7", are axially aligned bearing recesses 9 for operatively receiving the pivot pins 10 of a hood or cover 11 integrally including a hemi-cylindrical top wall 12 and semicircular end walls 13, constructed on a radius slightly greater than the distance between the center of the bearing recesses 9 and the most remote point in the bottom margin of the end walls 4 so as to adequately clear the wider faces of the casting 1 when swung from the "closed" position shown in Figure 4 to the "open" position shown in Figure 7. The hood 11, furthermore, is of such dimensions and contour that, when in "closed" position, one horizontal edge e of the hood top-wall 12 will project slightly down into the bight-portion 7' of the slot 7, and the adjacent portions of the bottom edges f of the hood end-walls 13 likewise extend into the leg-portions 7" of the slot 7, as shown in Figure 5, being bowed downwardly as at g to provide "drop-center" portions accommodating the pivot pins 10 and extending thence through the grooves 8 being complementarily tapered to fit along the bottom wall 8' thereof, as shown in Figure 6. Along its opposite margin, the hood top-wall is integrally provided with a narrow outwardly projecting stop-flange 14 resting against the upper face of the flange 5 in the respective positions shown in Figures 4 and 7, to limit the movement of the hood 11, and welded or otherwise rigidly secured to the stop-flange 14 is a handle-grip 15 projecting horizontally beyond one of the hood end-walls 13 for convenient accessibility in manually shifting the hood 11 from "closed" to "open" position.

Formed integrally upon the outer faces of each end wall 4 of the casting 1 is a vertically elongated boss 16 provided with a horizontally projecting pivot screw 17, and rockably mounted thereon is an eccentric circular counter-weight 18. Rigidly secured upon the peripheral faces of each of the counter-weights 18 is a flat spiral spring-cam 19 having a straight tangentially projecting end-portion 19' which normally extends outwardly and downwardly beyond the casting 1 and across the path through which the hood 11 travels as it moves from "closed" to "open" position. It should be noted that the one spring-cam 19 is an identical mirror-image of the other spring-cam 19, so that the two spring-cams will work together, as will presently be more fully understood.

Figure 8:
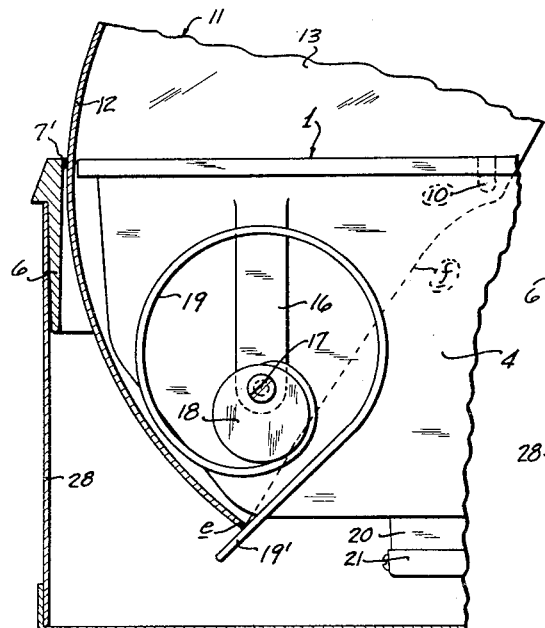
Figure 9:
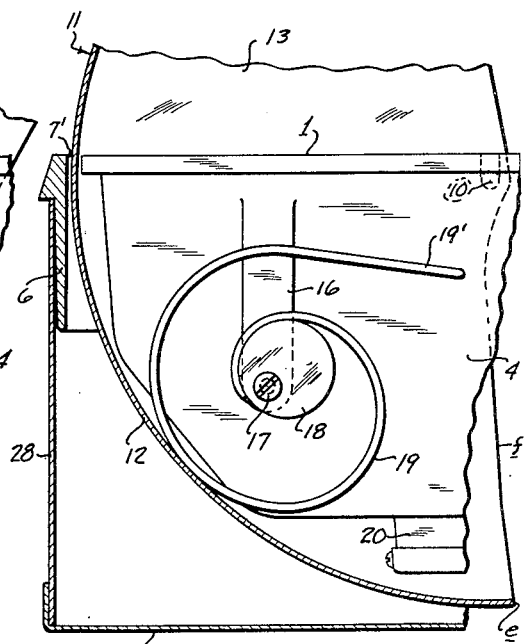
Figure 10:
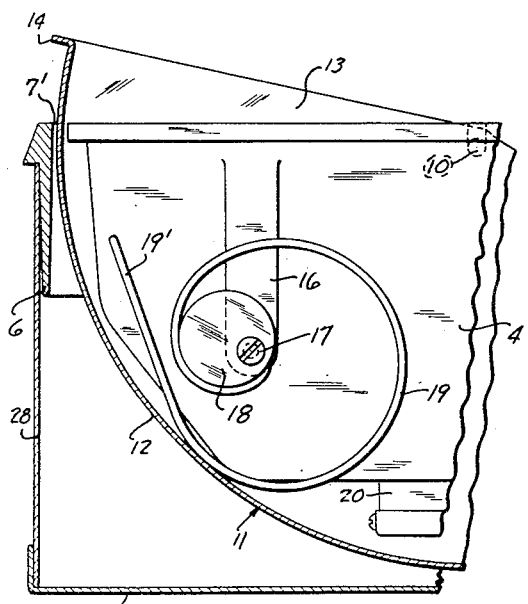
Figure 11:
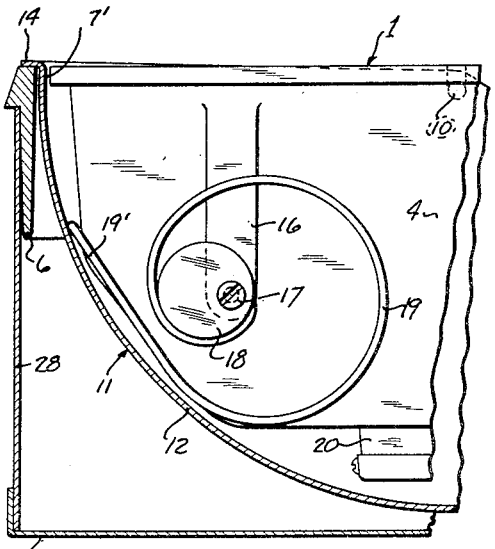

Thus, when the hood 11 is swung from "closed" to "open" position, the leading edge e will engage the end-portions 19' as shown in Figure 8, and carry them forward thereby rotating the spring-cams 19 into engagement with the inner face of the hood top-wall 12 as shown in Figure 9. At this point, the hood 11 is in a heavily over-balanced position inasmuch as its center of gravity is well to the left of the vertical plane passing through the center-line of the pivot pins 10 (reference being had to Figures 7 to 11, inclusive), and if left to swing freely the hood would pick up momentum rapidly as it approached "open" position so that the stop flange would crash forcefully against the upper face of the flange 5. However, the spring-cams 19, immediately upon being engaged, begin to exert a retardation or "braking" effect and roll around with the continued movement of the hood 11, the braking effect increasing as the diametrally larger portions of the spiral come into operative engagement, thus exerting a correspondingly increased bearing pressure against the hood top-wall 12. As the hood 12 approaches "open" position, however, its center of gravity approaches the vertical plane passing through the center-line of the pivot pins, therefore the accelerating effect of its weight is progressively diminished. Therefore, the spring cams 19 are so shaped that their diametral size begins to decrease sharply as the hood begins to "balance itself", so to speak, and in fact actually become automatically released as shown in Figure 10, at which point the counter-weights 18 are over-balanced to the left of the pivot screws 17 and cause the spring cams 19 to drop free into the position shown in Figure 11, with their end portions 19' in light contacting engagement against the inner face of the hood top-wall 12. As the hood 11 is returned to "closed" position the end portions 19' of the spring-cams 19 trail lightly against the inner face of the hood top-wall 12 and exert substantially no retardation or "breaking" effect at all. Finally, as the hood nears "closed" position the edge e passes beyond the points of contact with the end portions 19' and the spring cams 19 drop free, returning to original position as shown in Figure 8.

Formed integrally upon, and projecting downwardly from, the under face of the bottom wall 3 is a narrow preferably rectangular skirt 20 forming a downwardly opening recess r which is closed by a shallow sheet metal cover 21 removably held in place by screws 22. Suitably mounted within the recess r is an electrical heating element 23 having a connecting cord 24 which passes through an insulating grommet fixed in the skirt 20 and extends upwardly along one of the end walls 4 of the casting 1 to one corner thereof for connection to a conventional type of thermostatic control switch 25 mounted in the flange 5 and having an exposed manually operable control and setting knob 26. The hood 11 is so dimensioned that there will be adequate clearance between the outer face of the casting end wall 4 and the inner face of the hood end wall 13 to accommodate the connecting cord 24, and, furthermore, as shown in Figure 7, the contour of the lower edge f of the hood end wall 13 is such that, when the hood 11 is in "open" position there will be adequate clearance to accommodate the switch 25 and permit the connecting cord 24 to extend thereinto. Finally, the peripheral skirt 6 of the flange 5 is inwardly relieved upon its outer face as at 27 to accommodate an enclosing sheet metal housing or shell 28 having a bottom wall 29 spaced downwardly from the path of the hood 11 a sufficient distance to avoid interference with the movement thereof.

If desired, the handle-grip 15 may be eliminated and a modified form of hand-lever 15' mounted rigidly upon one of the pivot pins 10 as shown in Figure 12. Similarly, if desired for purposes of economy, one of the spring-cams 19 and its associated counter weight 18 may be eliminated, although two such spring-cams 19 are preferable in order to exert a balanced retardation or "braking" effect upon the hood 11 and thereby avoid putting torsional stresses upon the pivot pins 10.

It should be understood that changes and modifications in the form, construction, arrangement, and combination of the several parts of the hooded food container may be made and substituted for those herein shown and described without departing from the nature and principle of my invention.

Having thus described my invention, what I claim and desire to secure by Letters Patent is:

1. A food container comprising an upwardly opening pan, a hemi-cylindrical hood pivotally mounted upon the pan adjacent the top thereof and being of such a size as to fit over and above the pan opening in the formation of a closure therefor and being operatively mounted upon the pan for optional movement into completely concealed position, and a spiral spring swingably mounted at its inner end upon the side wall of the pan and having a radius substantially greater than the distance between its pivot point and the inner face of the hood and projecting into the path of travel of the hood when the latter is in concealed position whereby the spring will engage the hood as it swings into concealed position and roll against the inside face thereof with increasing compressive pressure, thereby applying an increasing decelerating force to the hood as the latter moves into concealed position.

2. A food container comprising a pan, a hemi-cylindrical hood pivotally mounted upon the pan adjacent the top thereof and being of such a size as to fit over and above the pan opening in the formation of a closure therefor and being operatively mounted upon the pan for optional movement into completely concealed position, and a counter-weighted spiral spring swingably mounted at its inner end upon the side wall of the pan and having a radius substantially greater than the distance between its pivot point and the inner face of the hood and projecting into the path of travel of the hood when the latter is in concealed position whereby the spring will engage the hood as it swings into concealed position and roll against the inside face thereof with increasing compressive pressure, thereby applying an increasing decelerating force to the hood as the latter moves into concealed position.

3. A food container comprising a pan, a hemi-cylindrical hood pivotally mounted upon the pan adjacent the top thereof and being of such a size as to fit over and above the pan opening in the formation of a closure therefor and being operatively mounted upon the pan for optional movement into completely concealed position, and spiral springs rigidly provided at one of their ends with counter-weights, the other end of said springs being free, said counter-weights being eccentrically pivoted upon opposite side walls of the pan the free end of said springs projecting downwardly into the path of the forward margin of the hood for engagement therewith when the hood moves into concealed position, whereby said free end will be lifted to cause the counter-weights to be rocked bringing the spiral portion of the springs into frictional engagement with the hood as the latter moves into concealed position for retarding movement thereof.

4. A food container comprising a pan, a hemi-cylindrical hood pivotally mounted upon said pan for optional movement into completely concealed position below said pan, an eccentric circular counter-weight pivotally mounted on the end walls of said pan, and a spring cam mounted at its inner end upon said counter-weight and disposed spirally therearound, said cam having a tangentially projecting end portion which extends outwardly and downwardly beyond the pan and across the path through which the hood travels when moving into concealed position, whereby the engagement of the hood and said tangential end portion of the spring cam will cause the counter-weight to be rocked bringing the spiral portion of the springs into frictional engagement with the inner face of the hood to retard the speed of movement thereof into concealed position.

5. A food container comprising a pan, a hemi-cylindrical hood pivotally mounted upon said pan for optional movement into completely concealed position below said pan, an eccentric circular counter-weight pivotally mounted on an elongated boss extending from the end walls of said pan, and a spring cam mounted at its inner end upon said counter-weight and disposed spirally therearound, said cam having a tangentially projecting end portion which extends outwardly and downwardly beyond the pan and across the path through which the hood travels when moving into concealed position, whereby the engagement of the hood and said tangential end portion of the spring cam will cause the counter-weight to be rocked bringing the spiral portion of the springs into frictional engagement with the inner face of the hood to retard the speed of movement thereof into concealed position.

6. A food container comprising a pan, a hemi-cylindrical hood pivotally mounted upon said pan for optional movement into completely concealed position below said pan, an eccentric circular counter-weight pivotally mounted on an elongated boss extending from the end walls of said pan, and a spring cam mounted at its inner end upon said counter-weight and disposed spirally therearound, said cam having a tangentially projecting end portion which extends outwardly and downwardly beyond the pan and across the path through which the hood travels when moving into concealed position whereby, in retarding the rate of movement of said hood, the spring cam is pushed out of said path thus rotating said counter-weight so that on return movement of said hood there is no portion of the spring interposed in said path.

FRANK T. HILLIKER.

REFERENCES CITED

The following references are of record in the file of this patent:

UNITED STATES PATENTS

| Number | Name | Date |
|---|---|---|
| 717,870 | Landauer | Jan. 6, 1903 |
| 896,637 | Herrman | Aug. 18, 1908 |
| 968,828 | Beckley | Aug. 30, 1910 |
| 1,455,395 | Exum | May 15, 1923 |
| 1,866,649 | Hale | July 12, 1932 |
| 1,970,128 | Collins | Aug. 14, 1934 |
| 2,196,035 | Shaw | Apr. 2, 1940 |
| 2,225,623 | Crawford | Dec. 24, 1940 |